(12) United States Patent
Brown et al.

(10) Patent No.: US 10,914,239 B2
(45) Date of Patent: Feb. 9, 2021

(54) HIGH-SPEED SECTION DISCONNECT FOR DRIVEN TURBOCHARGER

(71) Applicant: SuperTurbo Technologies, Inc., Loveland, CO (US)

(72) Inventors: Jared William Brown, Loveland, CO (US); Christopher David Benson, Loveland, CO (US); Sterling Holman, Loveland, CO (US)

(73) Assignee: SUPERTURBO TECHNOLOGIES, INC., Loveland, CO (US)

( * ) Notice: Subject to any disclaimer, the term of this patent is extended or adjusted under 35 U.S.C. 154(b) by 0 days.

(21) Appl. No.: 15/694,528

(22) Filed: Sep. 1, 2017

(65) Prior Publication Data

US 2018/0128184 A1 May 10, 2018

Related U.S. Application Data

(60) Provisional application No. 62/382,316, filed on Sep. 1, 2016.

(51) Int. Cl.
| | |
|---|---|
| *F02C 7/36* | (2006.01) |
| *F02B 67/10* | (2006.01) |
| *F02B 37/10* | (2006.01) |
| *F02B 41/10* | (2006.01) |
| *F02B 39/04* | (2006.01) |

(Continued)

(52) U.S. Cl.
CPC .............. *F02C 7/36* (2013.01); *F02B 37/10* (2013.01); *F02B 39/04* (2013.01); *F02B 39/12* (2013.01); *F02B 41/10* (2013.01); *F02B 67/10* (2013.01); *F02C 6/12* (2013.01); *F05D 2220/40* (2013.01); *F05D 2260/406* (2013.01); *F05D 2260/4023* (2013.01); *F05D 2260/4031* (2013.01); *Y02T 10/12* (2013.01)

(58) Field of Classification Search
CPC ... Y02T 10/16; Y02T 10/166; F02B 37/00–24
See application file for complete search history.

(56) References Cited

U.S. PATENT DOCUMENTS 2,585,968 A * 2/1952 Schneider ............. F02B 37/105
  60/345
4,535,592 A * 8/1985 Zinsmeyer ............. F02B 37/22
  60/597

(Continued)

FOREIGN PATENT DOCUMENTS

CN 102822471 12/2015
GB 718100 A * 11/1954 ............ F02B 37/105

(Continued)

*Primary Examiner* — Laert Dounis
(74) *Attorney, Agent, or Firm* — Cochran Freund & Young LLC; William W. Cochran (57) ABSTRACT

Disclosed is a high-speed section disconnect for a driven turbocharger with a traction drive. The turbo shaft is attached to a turbine and compressor, and interfaces with a high-speed traction drive. A mechanical coupling connects the traction drive to a transmission, which is connected to the engine so that power can flow to or from the turbo shaft, but the mechanical coupling can be selectively disconnected so that the high-speed section of the driven turbocharger can also be decoupled from the engine during certain operating conditions to reduce mechanical losses in the system.

11 Claims, 11 Drawing Sheets

(51) Int. Cl.
*F02B 39/12* (2006.01)
*F02C 6/12* (2006.01)

(56) References Cited

U.S. PATENT DOCUMENTS

| | | | | |
|---|---|---|---|---|
| 5,133,188 | A | * | 7/1992 | Okada ................. F02B 37/04 123/561 |
| 5,400,596 | A | * | 3/1995 | Shlien ................. F02G 5/02 60/597 |
| 5,729,978 | A | * | 3/1998 | Hiereth ............... F02B 37/105 60/607 |
| 8,561,403 | B2 | | 10/2013 | VanDyne et al. |
| 8,668,614 | B2 | | 3/2014 | Sherrill et al. |
| 9,217,363 | B2 | | 12/2015 | Riley et al. |
| 9,581,078 | B2 | | 2/2017 | Brinks et al. |
| 9,670,832 | B2 | | 6/2017 | Sherrill et al. |
| 2010/0031935 | A1 | * | 2/2010 | VanDyne ............. F02B 37/105 123/559.1 |
| 2013/0017920 | A1 | * | 1/2013 | Sherrill ............... F16H 13/10 475/183 |
| 2015/0361905 | A1 | * | 12/2015 | Lofgren ............... B60K 6/24 417/34 |
| 2016/0047298 | A1 | * | 2/2016 | Lofgren ............... F02B 37/14 60/273 |
| 2016/0319734 | A1 | * | 11/2016 | Milanovic ........... F02B 41/10 |
| 2017/0305428 | A1 | * | 10/2017 | Matsuo ............... F16H 61/0031 |

FOREIGN PATENT DOCUMENTS

| | | | |
|---|---|---|---|
| WO | 2011/096936 A1 | 8/2011 | |
| WO | WO-2014180982 A2 * | 11/2014 | ........... F16H 37/022 |

* cited by examiner

HIGH-SPEED SECTION DISCONNECT FOR DRIVEN TURBOCHARGER

BACKGROUND

Driven turbochargers are an improvement over normal turbochargers since driven turbochargers (super-turbochargers) are powered by more than just the exhaust gas turbine, which reduces turbo-lag in boosted engines. Driven turbochargers can also direct excess turbine power back to the engine to increase engine efficiency. One class of driven turbocharger utilizes a traction drive that interfaces with the turbo shaft to provide torque to and from the turbo shaft.

SUMMARY

An embodiment of the present invention may therefore comprise a driven turbocharger for an engine comprising: a turbo shaft; a compressor connected to a first location on the turbo shaft; a turbine connected to a second location on the turbo shaft; a planetary traction drive that interfaces with the turbo shaft to transmit power to and from the turbo shaft; a transmission coupled to the engine; a mechanical coupling between the planetary traction drive and the transmission that can be selectively decoupled so that the turbo shaft can operate in a free-spinning manner.

An embodiment of the present invention may therefore further comprise a method of coupling a driven turbocharger to an engine comprising: connecting a compressor to a first location on a turbo shaft; connecting a turbine to a second location on the turbo shaft; interfacing a planetary traction drive to the turbo shaft to transmit power to and from the turbo shaft; coupling a transmission to the engine; coupling and decoupling the planetary traction drive and the transmission so that the turbo shaft can operate in a free-spinning manner when the planetary traction drive is decoupled from the transmission.

DETAILED DESCRIPTION OF THE EMBODIMENTS

Figure 1:
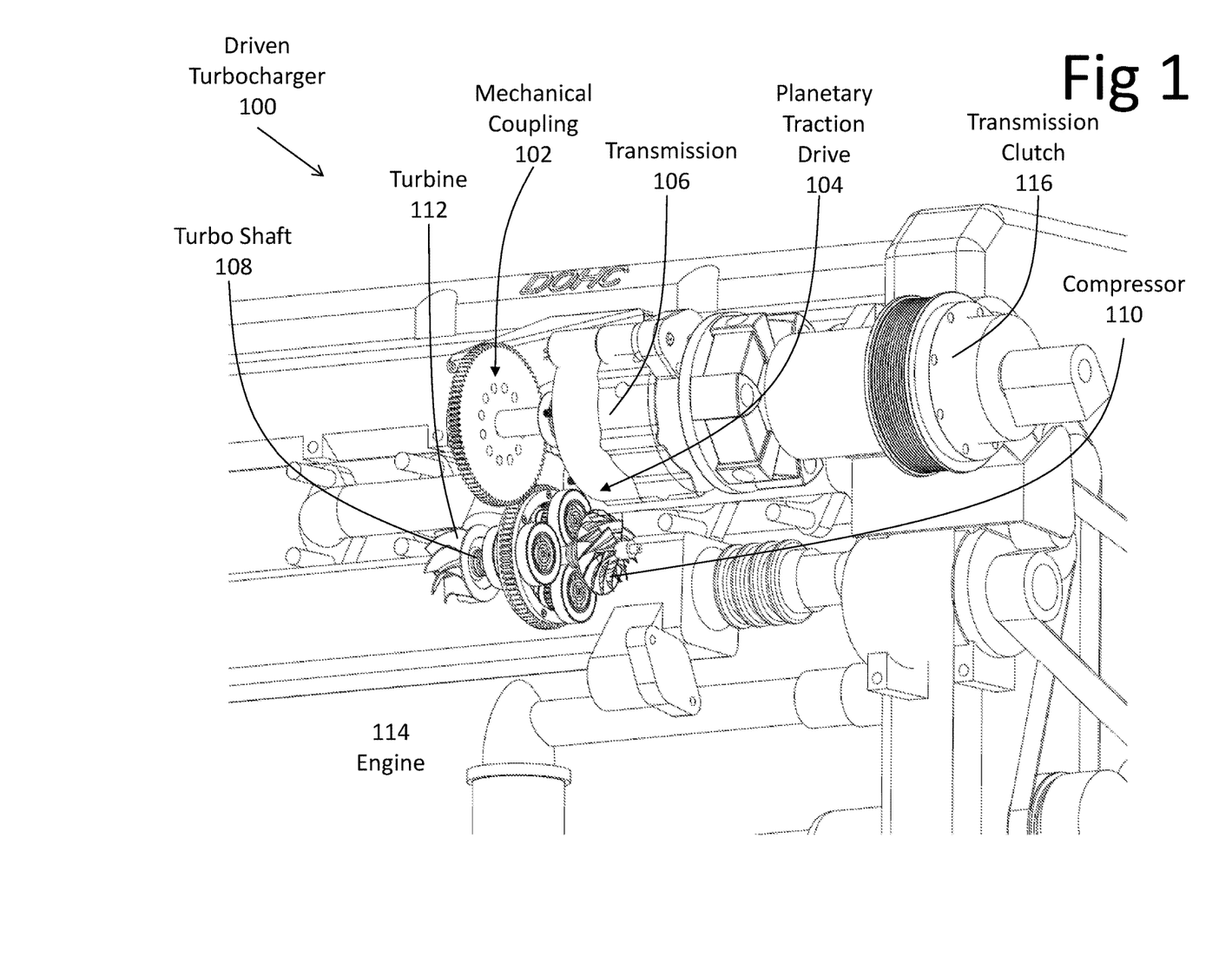
FIG. 1 is an isometric view of a driven turbocharger with a mechanical coupling between a planetary traction drive and a transmission that can be selectively decoupled so that a turbo shaft can operate in a free-spinning manner.

FIG. 1 is an isometric view of a driven turbocharger 100 with a mechanical coupling 102 between a planetary traction drive 104 and a transmission 106 that can be selectively decoupled so that a turbo shaft 108 can operate in a free-spinning manner. Driven turbocharger 100 is comprised of turbo shaft 108, which is connected to compressor 110 and turbine 112; planetary traction drive 104, which reduces the rotational speed of turbo shaft 108 and transmits power to and from turbo shaft 108; and transmission 106, which connects planetary traction drive 104 to engine 114. Housings on driven turbocharger 100 are not shown. The operation of driven turbocharger 100 is as taught in U.S. Pat. No. 8,561,403, issued Oct. 22, 2013, entitled "Super-Turbocharger Having a High Speed Traction Drive and a Continuously Variable Transmission," U.S. Pat. No. 8,668,614, issued Mar. 11, 2014, entitled "High Torque Traction Drive," U.S. Pat. No. 8,608,609, issued Dec. 17, 2013, entitled "Symmetrical Traction Drive," U.S. Pat. No. 9,670,832, issued Jun. 6, 2017, entitled "Thrust Absorbing Planetary Traction Drive Superturbo," and U.S. patent application Ser. No. 14/935,541, filed Nov. 9, 2015, entitled "Eccentric Planetary Traction Drive Super-Turbocharger," U.S. Pat. Nos. 8,561,403, 8,668,614, 8,608,609, 9,670,832 and application Ser. No. 14/935,541, are specifically incorporated herein by reference for all that they disclose and teach.

During many operating conditions of engine 114, it is beneficial to transmit power to and from turbo shaft 108. During transient operation of engine 114, power from engine 114 flows through transmission 106 and planetary traction drive 104 to quickly increase the speed of turbo shaft 108 for better torque response from engine 114. During some operating points of engine 114, excess power from turbine 112 flows through planetary traction drive 104 and transmission 106 to provide additional power to engine 114. However, some operating regimes of engine 114 have balanced power transfer from turbine 112 to compressor 110, such that power throughput to engine 114 is unnecessary. During these operating regimes, it is beneficial to decouple turbo shaft 108 from transmission 106 to allow turbo shaft 108 to operate as a free-spinning turbocharger, and reduce mechanical losses from the rest of the system. For this, a mechanical coupling 102 is provided that links planetary traction drive 104 to transmission 106 that can be selectively decoupled. When power throughput between engine 114 and turbo shaft 108 is desired, mechanical coupling 102 is engaged to provide power throughput between planetary traction drive 104 and transmission 106. When operation of turbo shaft 108 as a free-spinning turbocharger is optimal, mechanical coupling 102 is decoupled, so that there is no power throughput through planetary traction drive 104, and turbo shaft 108 operates as in a standard turbocharger. The addition of transmission clutch 116 between transmission 106 and engine 114 also allows for transmission 106 to be decoupled from engine 114, so no drag losses are imposed on engine 114. In this way, when power throughput through driven turbocharger 100 is not necessary, turbo shaft 108 and engine 114 can be decoupled from transmission 106 to reduce mechanical losses of the system.

When mechanical coupling 102 is engaged from a decoupled state, it is generally beneficial to match rotational speeds of the two sides being engaged. Before mechanical coupling 102 is engaged, transmission clutch 116, if present, can be closed to connect transmission 106 to engine 114, and transmission 106 can be shifted to a ratio that matches rotational speeds on either side of mechanical coupling 102. Effectively, transmission 106 is shifted to a ratio that would produce the rotational speed of turbo shaft 108 if mechanical coupling 102 was engaged. Generally, transmission 106 is a continuously variable transmission, so fine tuning of ratio control is possible. At this point, the speed differential across mechanical coupling 102 is near zero, so that mechanical coupling 102 can be closed with minimal shock torque spikes to the driven turbocharger 100. This method of engagement also reduces wear on any frictional components of mechanical coupling 102, increasing life of the device.

Figure 2:
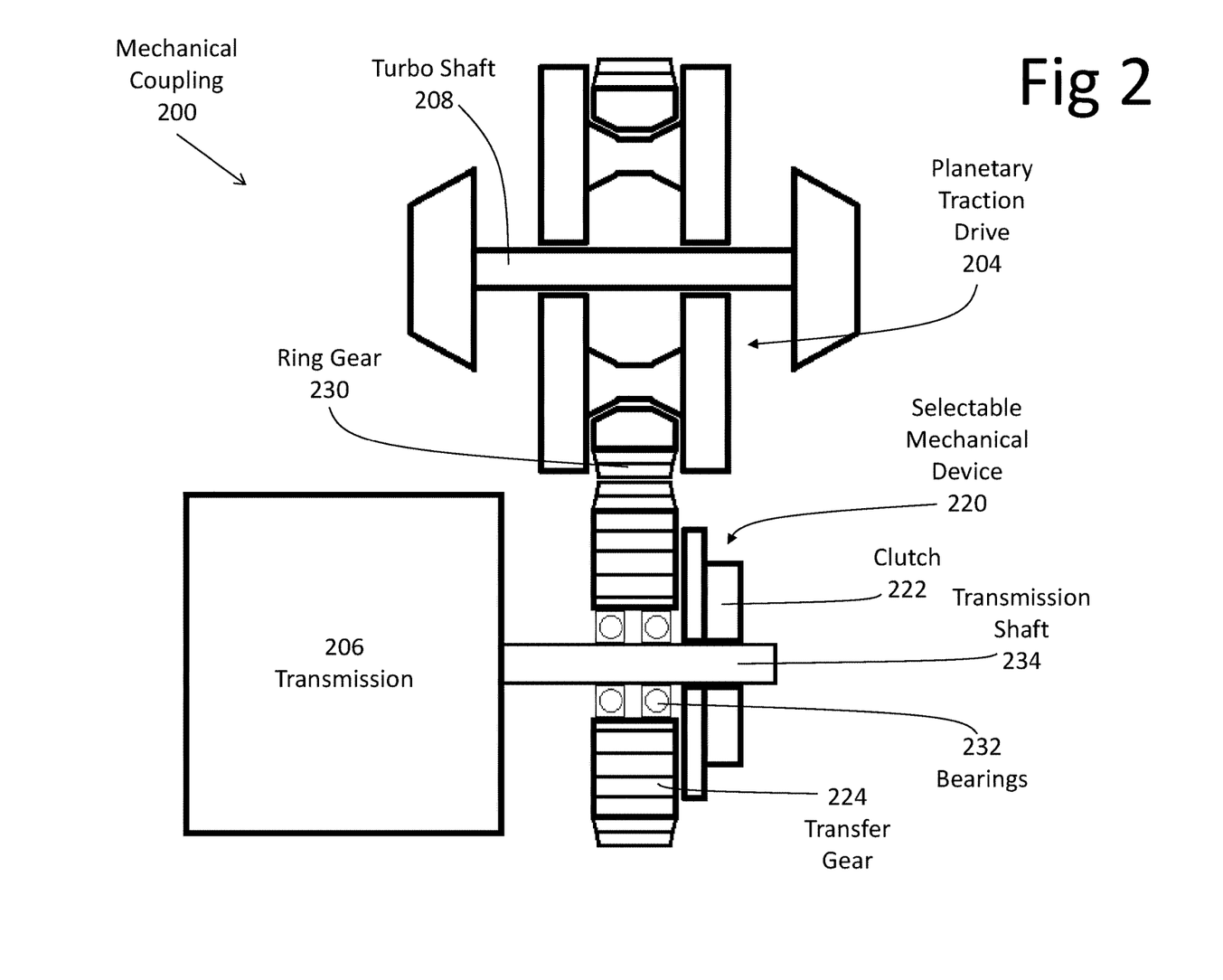
FIG. 2 is a schematic of an embodiment of a mechanical coupling that utilizes a clutch as a selectable mechanical device with a transfer gear.

FIG. 2 is a schematic of an embodiment of a mechanical coupling 200 that utilizes a clutch 222 as a selectable mechanical device 220 with a transfer gear 224. Planetary traction drive 204 has a ring gear 230 that acts as a low-speed output. Ring gear 230 meshes with transfer gear 224, which in turn is mounted on bearings 232 on transmission shaft 234, Transmission shaft 234 is connected to transmission 206. Bearings 232 allow transfer gear 224 to rotate independently from transmission shaft 234 when clutch 222 is open, and selectable mechanical device 220 is not engaged. This allows planetary traction drive 204 and turbo shaft 208 to rotate independently of transmission 206. This free-spinning action of turbo shaft 208 reduces mechanical losses of the system associated with transmission 206 when power throughput to or from turbo shaft 208 is not needed. When power transmission through mechanical coupling 200 is needed, clutch 222 is closed to lock transfer gear 224 to transmission shaft 234, allowing power to flow between transmission 206 and planetary traction drive 204.

Figure 3:
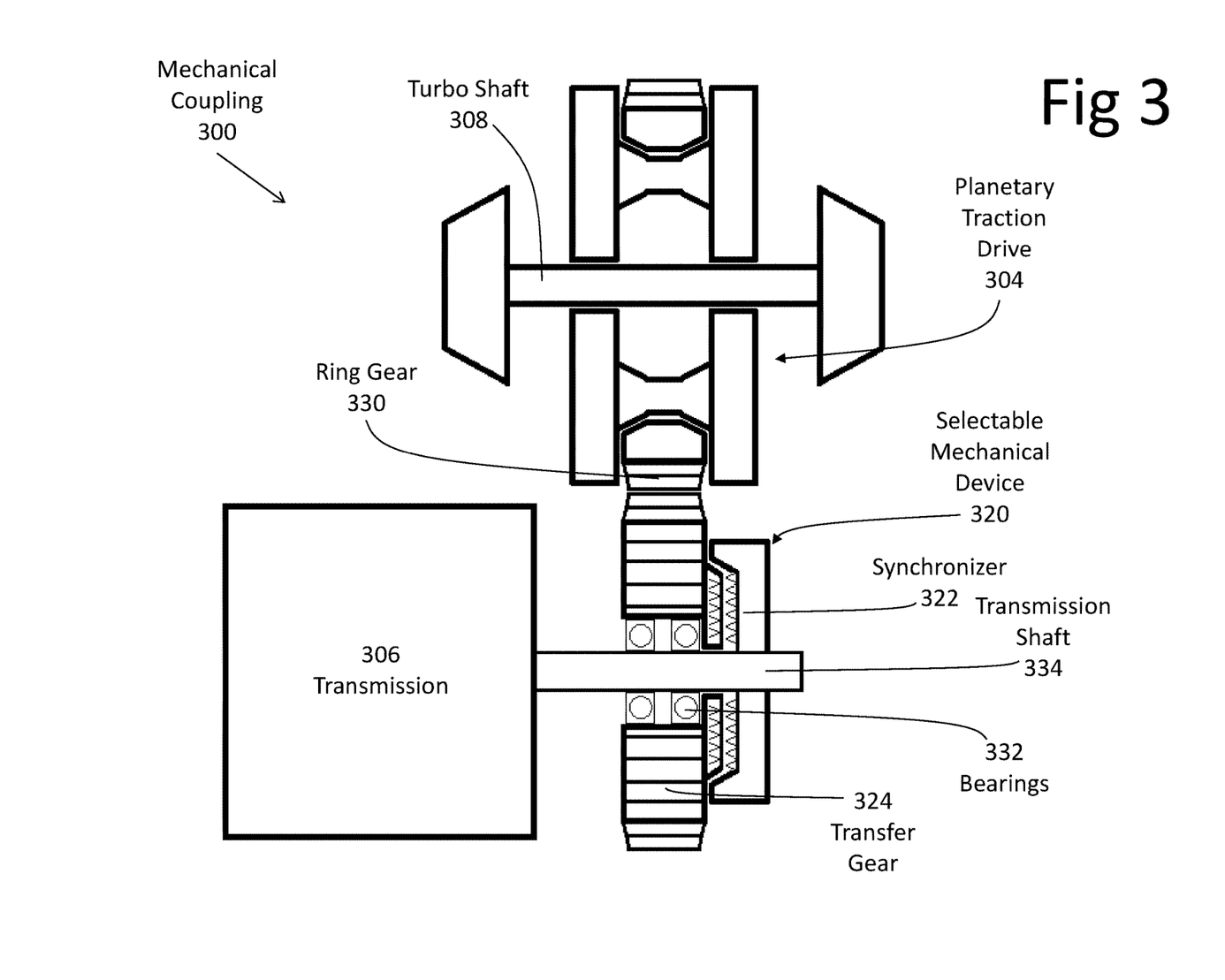
FIG. 3 is a schematic of an embodiment of a mechanical coupling that utilizes a synchronizer as a selectable mechanical device with a transfer gear.

FIG. 3 is a schematic of an embodiment of a mechanical coupling 300 that utilizes a synchronizer 322 as a selectable mechanical device 320 with a transfer gear 324. Planetary traction drive 304 has a ring gear 330 that acts as a low-speed output. Ring gear 330 meshes with transfer gear 324, which in turn is mounted on bearings 332 on transmission shaft 334, Transmission shaft 334 is connected to transmission 306. Bearings 332 allow transfer gear 324 to rotate independently from transmission shaft 334 when synchronizer 332 is disconnected, and selectable mechanical device 320 is not engaged. This allows planetary traction drive 304 and turbo shaft 308 to rotate independently of transmission 306. This free-spinning action of turbo shaft 308 reduces mechanical losses of the system associated with transmission 306 when power throughput to or from turbo shaft 308 is not needed. When power transmission through mechanical coupling 300 is needed, synchronizer 322 is engaged to lock transfer gear 324 to transmission shaft 334, allowing power to flow between transmission 306 and planetary traction drive 304.

Figure 4:
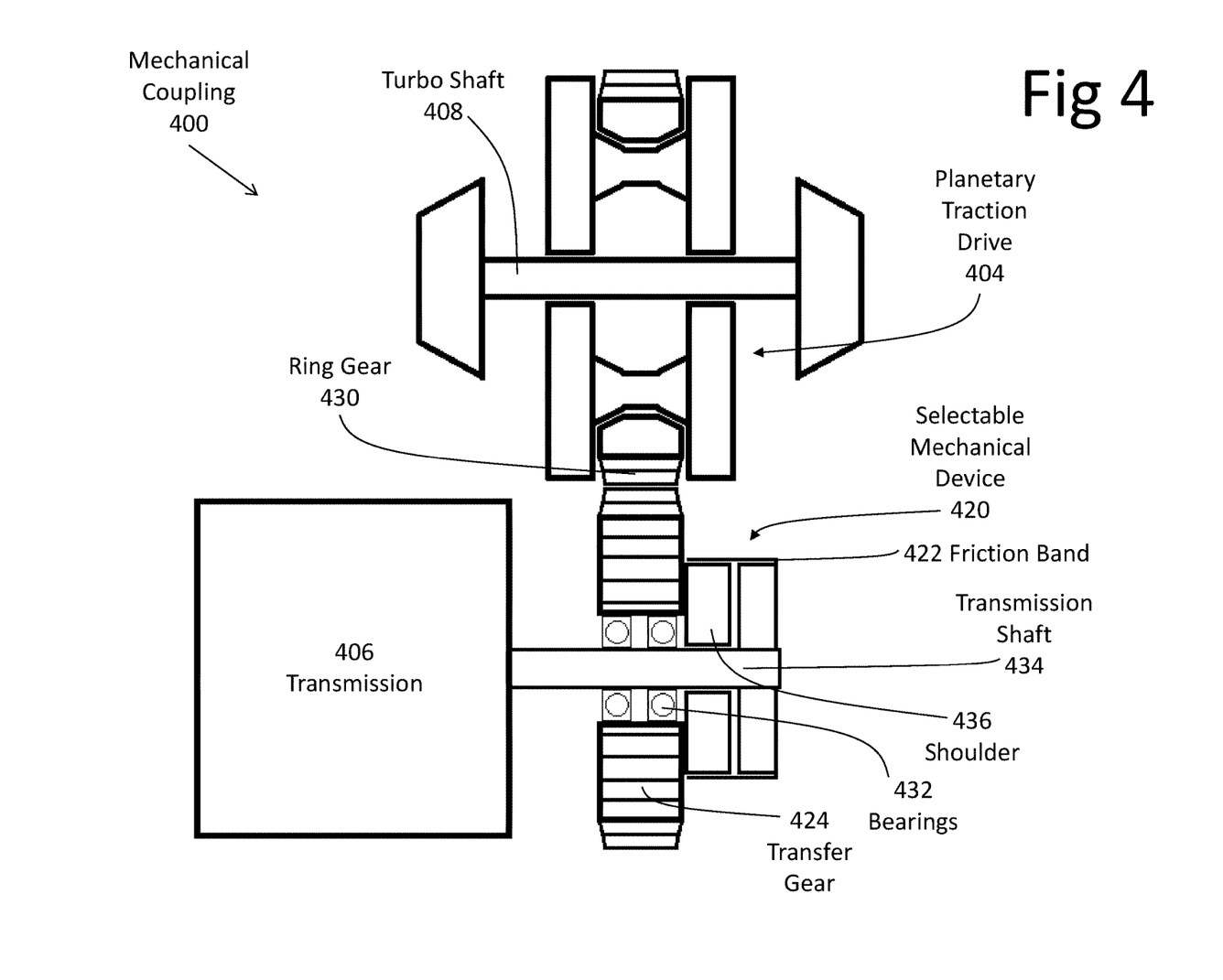
FIG. 4 is a schematic of an embodiment of a mechanical coupling that utilizes a friction band as a selectable mechanical device with a transfer gear.

FIG. 4 is a schematic of an embodiment of a mechanical coupling 400 that utilizes a friction band 422 as a selectable mechanical device 420 with a transfer gear 424. Planetary traction drive 404 has a ring gear 430 that acts as a low-speed output. Ring gear 430 meshes with transfer gear 424, which in turn is mounted on bearings 432 on transmission shaft 434. Transmission shaft 434 is connected to transmission 406. Bearings 432 allow transfer gear 424 to rotate independently from transmission shaft 434 when friction band 422 is disconnected, and selectable mechanical device 420 is not engaged. This allows planetary traction drive 404 and turbo shaft 408 to rotate independently of transmission 406. This free-spinning action of turbo shaft 408 reduces mechanical losses of the system associated with transmission 406 when power throughput to or from turbo shaft 408 is not needed. When power transmission through mechanical coupling 400 is needed, friction band 422 is engaged to lock transfer gear 424 to transmission shaft 434, allowing power to flow between transmission 406 and planetary traction drive 404. Friction band 422 encircles a shoulder 436 of transfer gear 424 as well as transmission shaft 434. When friction band 422 is open, it allows transfer gear 424 and transmission shaft 434 to rotate at different speeds. When friction band 422 is closed, it clamps down on shoulder 436 of transfer gear 424 and transmission shaft 434, locking transfer gear 424 and transmission shaft 434 together and engaging selectable mechanical device 420.

Figure 5:
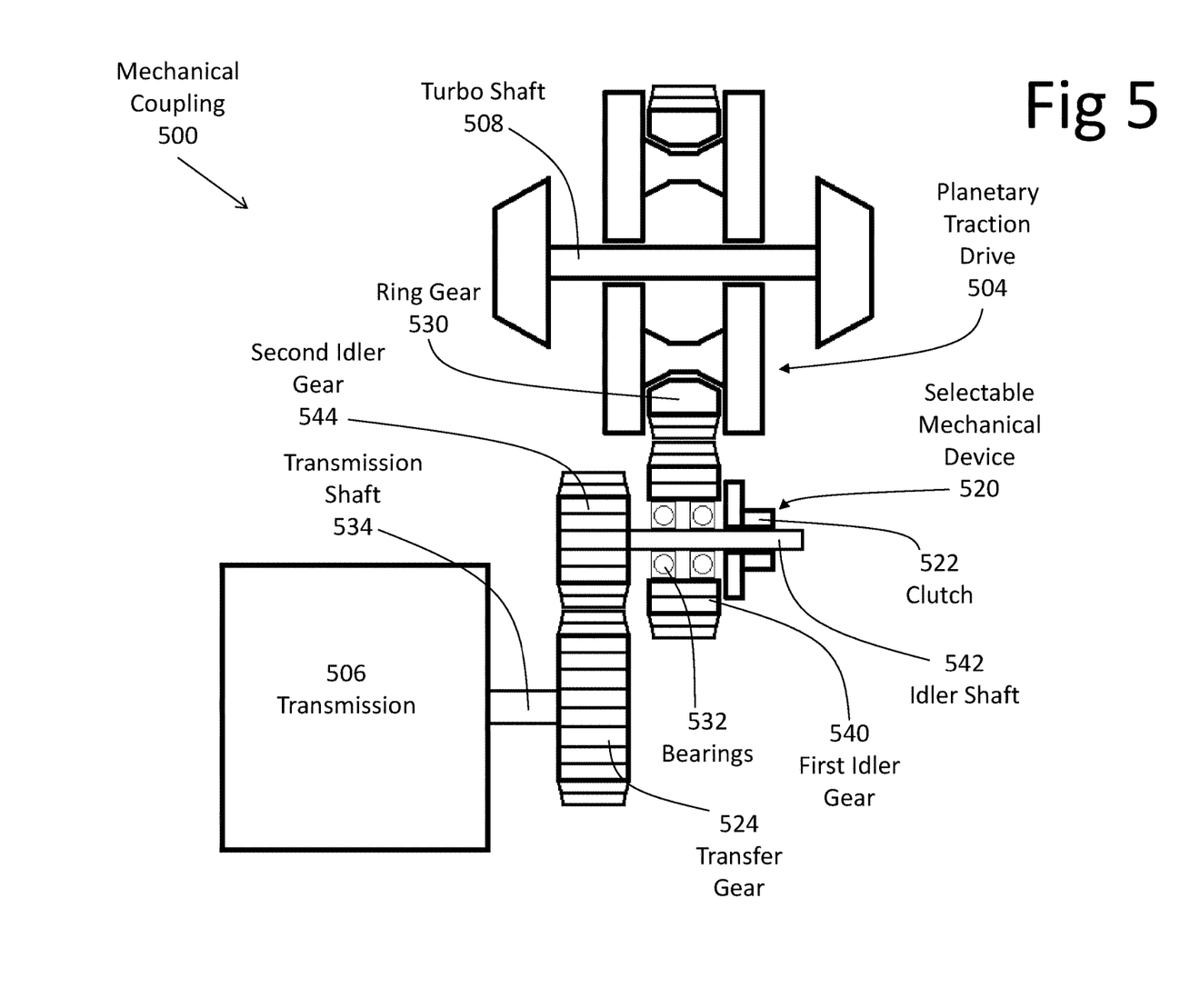
FIG. 5 is a schematic of an embodiment of a mechanical coupling that utilizes a clutch as a selectable mechanical device with a first idler gear.

FIG. 5 is a schematic of an embodiment of a mechanical coupling 500 that utilizes a clutch 522 as a selectable mechanical device 520 with a first idler gear 540. Planetary traction drive 504 has a ring gear 530 that acts as a low-speed output. Ring gear 530 meshes with first idler gear 540, which in turn is mounted on bearings 532 on idler shaft 542. A second idler gear 544 is mounted on idler shaft 542, and meshes with transfer gear 524. Transfer gear 524 is mounted on transmission shaft 534, which is connected to transmission 506. Bearings 532 allow first idler gear 540 to rotate independently from idler shaft 542 when clutch 522 is open, and selectable mechanical device 520 is not engaged. This allows planetary traction drive 504 and turbo shaft 508 to rotate independently of transmission 506. This free-spinning action of turbo shaft 508 reduces mechanical losses of the system associated with transmission 506 when power throughput to or from turbo shaft 508 is not needed. When power transmission through mechanical coupling 500 is needed, clutch 522 is closed to lock first idler gear 540 to idler shaft 542, allowing power to flow between transmission 506 and planetary traction drive 504. The addition of idler shaft 542, first idler gear 540, and second idler gear 544 allows for additional flexibility in mechanical coupling 500. Additional gear ratio can be implemented between transmission 506 and planetary traction drive 504. First idler gear 540 can be smaller than the transfer gear in FIG. 2 without losing overall gear ratio, to reduce windage losses when selectable mechanical device 520 is not engaged.

Figure 6:
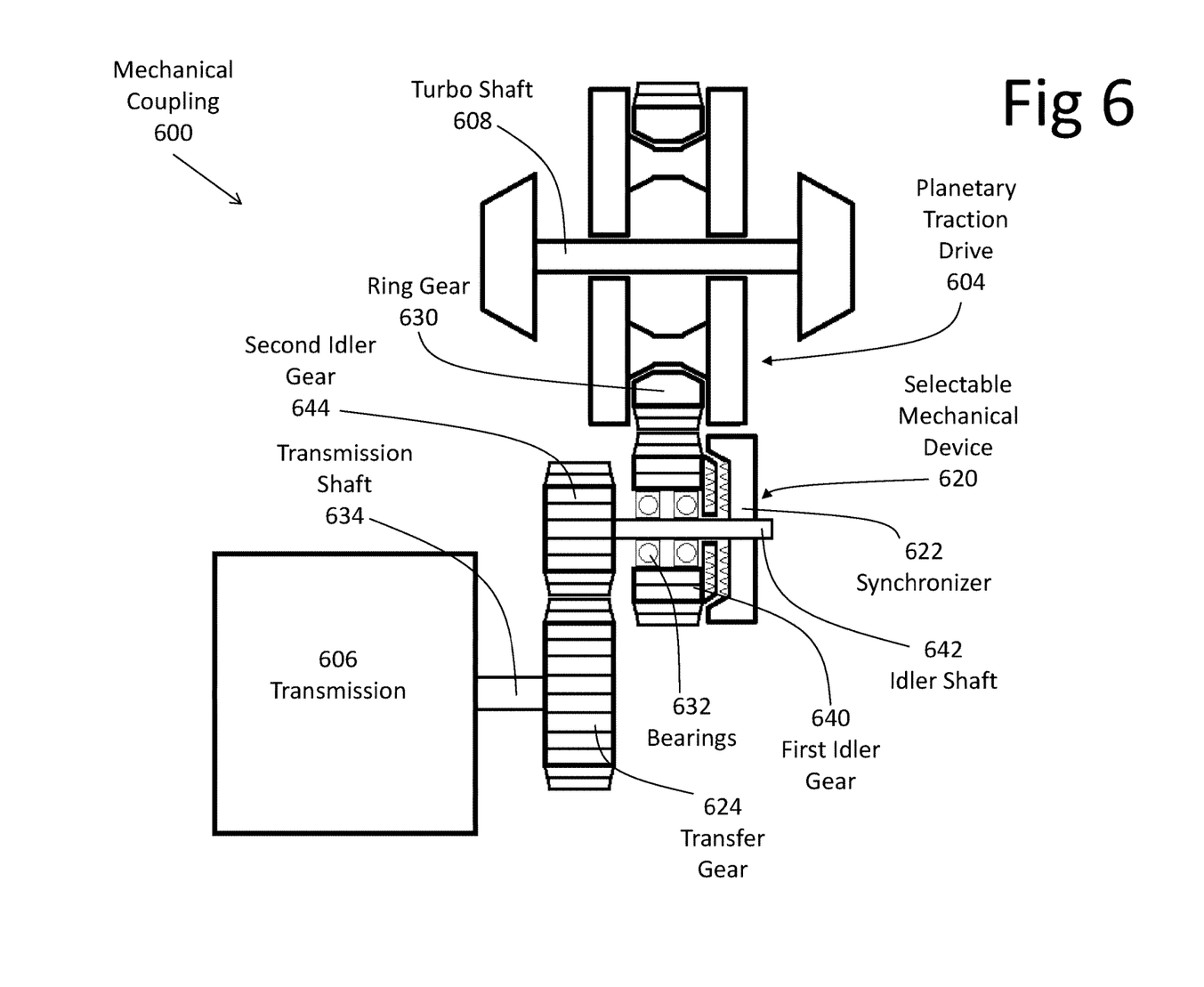
FIG. 6 is a schematic of an embodiment of a mechanical coupling that utilizes a synchronizer as a selectable mechanical device with a first idler gear.

FIG. 6 is a schematic of an embodiment of a mechanical coupling 600 that utilizes a synchronizer 622 as a selectable mechanical device 620 with a first idler gear 640. Planetary traction drive 604 has a ring gear 630 that acts as a low-speed output. Ring gear 630 meshes with first idler gear 640, which in turn is mounted on bearings 632 on idler shaft 642. A second idler gear 644 is mounted on idler shaft 642, and meshes with transfer gear 624. Transfer gear 624 is mounted on transmission shaft 634, which is connected to transmission 606. Bearings 632 allow first idler gear 640 to rotate independently from idler shaft 642 when synchronizer 622 is decoupled, and selectable mechanical device 620 is not engaged. This allows planetary traction drive 604 and turbo shaft 608 to rotate independently of transmission 606. This free-spinning action of turbo shaft 608 reduces mechanical losses of the system associated with transmission 606 when power throughput to or from turbo shaft 608 is not needed. When power transmission through mechanical coupling 600 is needed, synchronizer 622 is engaged to lock first idler gear 640 to idler shaft 642, allowing power to flow between transmission 606 and planetary traction drive 604. The addition of idler shaft 642, first idler gear 640, and second idler gear 644 allows for additional flexibility in mechanical coupling 600. Additional gear ratio can be implemented between transmission 606 and planetary traction drive 604. First idler gear 640 can be smaller than the transfer gear in FIG. 3 without losing overall gear ratio, to reduce windage losses when selectable mechanical device 620 is not engaged.

Figure 7:
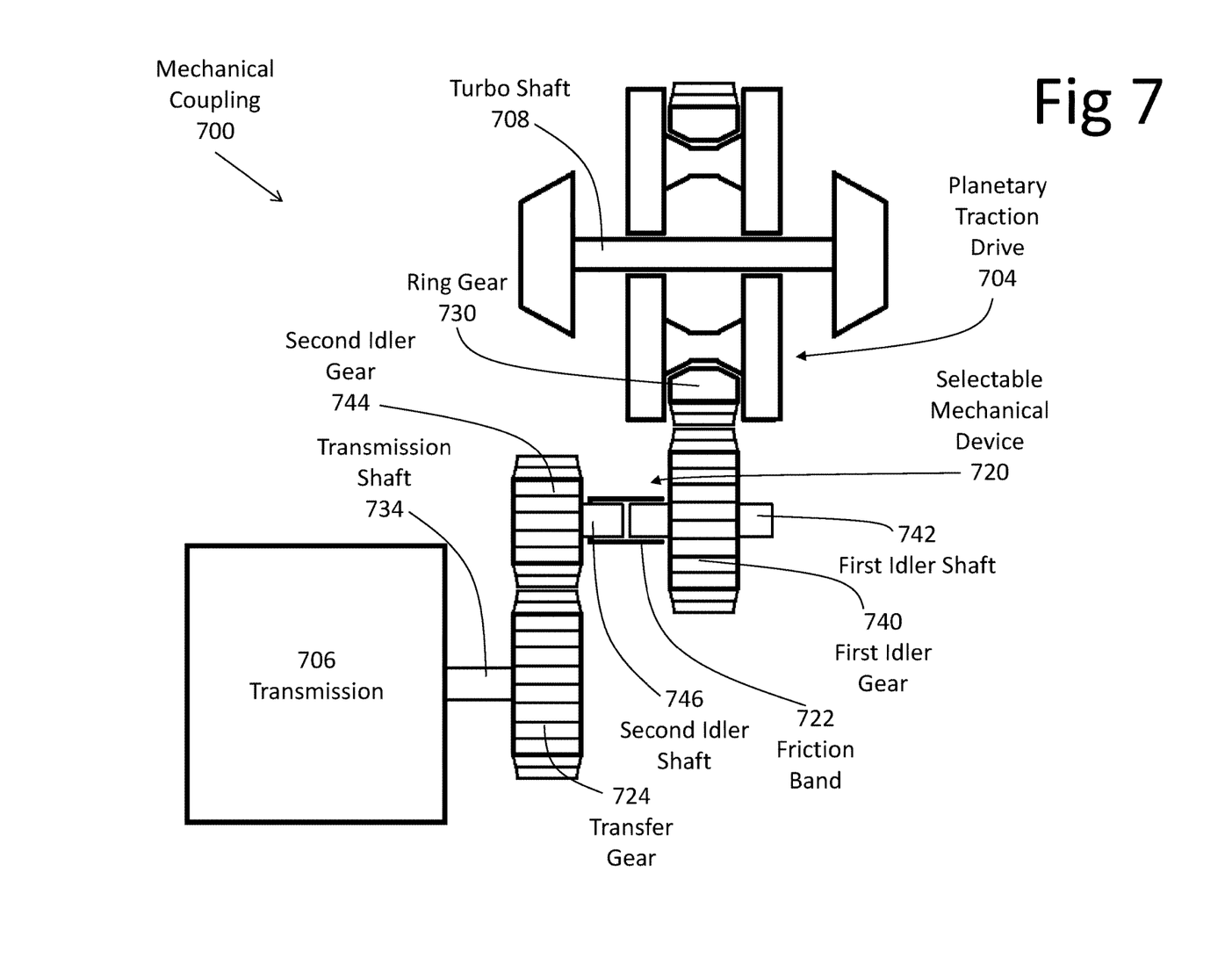
FIG. 7 is a schematic of an embodiment of a mechanical coupling that utilizes a friction band as a selectable mechanical device with a first idler shaft and a second idler shaft.

FIG. 7 is a schematic of an embodiment of a mechanical coupling 700 that utilizes a friction hand 722 as a selectable mechanical device 720 with a first idler shaft 742 and a second idler shaft 746. Planetary traction drive 704 has a ring gear 730 that acts as a low-speed output. Ring gear 730 meshes with first idler gear 740, which is mounted on first idler shaft 742. Friction band 722 selectively connects first idler shaft 742 and second idler shaft 746 to form selectable mechanical device 720. A second idler gear 744 is mounted on second idler shaft 746 and meshes with transfer gear 724. Transfer gear is mounted on transmission shaft 734, which is connected to transmission 706. When friction band 722 is open, first idler shaft 742 spins independently from second idler shaft 746, which allows planetary traction drive 704 and turbo shaft 708 to rotate independently of transmission 706. This free-spinning action of turbo shaft 708 reduces mechanical losses of the system associated with transmission 706 when power throughput to or from turbo shaft 708 is not needed. When power transmission through mechanical coupling 700 is needed, friction band 722 is closed to lock first idler shaft 742 to second idler shaft 746, allowing power to flow between transmission 706 and planetary traction drive 704. The addition of first idler shaft 742, first idler gear 740, second idler shaft 746, and second idler gear 744 allows for additional flexibility in mechanical coupling 700. Additional gear ratio can be implemented between transmission 706 and planetary traction drive 704. First idler gear 740 can be smaller than the transfer gear in FIG. 4 without losing overall gear ratio, to reduce windage losses when selectable mechanical device 720 is not engaged.

Figure 8:
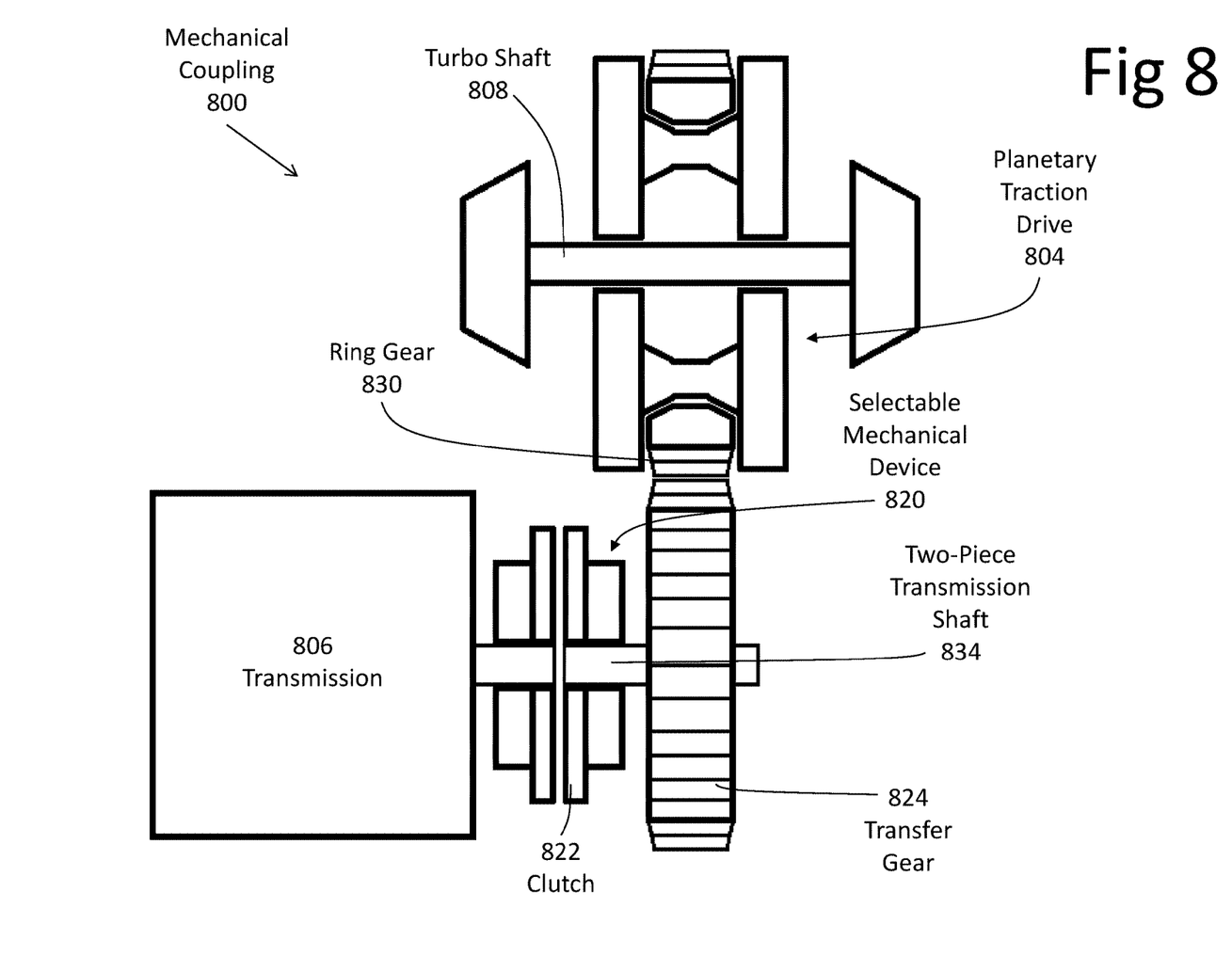
FIG. 8 is a schematic of an embodiment of a mechanical coupling that utilizes a two-piece transmission shaft with a clutch as a selectable mechanical device.

FIG. 8 is a schematic of an embodiment of a mechanical coupling 800 that utilizes a two-piece transmission shaft 834 with a clutch 822 as a selectable mechanical device 820. Planetary traction drive 804 has a ring gear 830 that acts as a low-speed output. Ring gear 830 meshes with transfer gear 824, which in turn is mounted on two-piece transmission shaft 834. Transmission 806 is connected to an opposite end of two-piece transmission shaft 834. Clutch 822 closes to connect the two halves of two-piece transmission shaft 834 together when power transmission through selectable mechanical device 820 is needed. When power throughput to turbo shaft 808 is not needed, clutch 822 opens to disengage selectable mechanical device 820 and allow transfer gear 824 to rotate independently of transmission 806. This allows planetary traction drive 804 and turbo shaft 808 to rotate independently of transmission 806. This free-spinning action of turbo shaft 808 reduces mechanical losses of the system associated with transmission 806 when power throughput to or from turbo shaft 808 is not needed.

Figure 9:
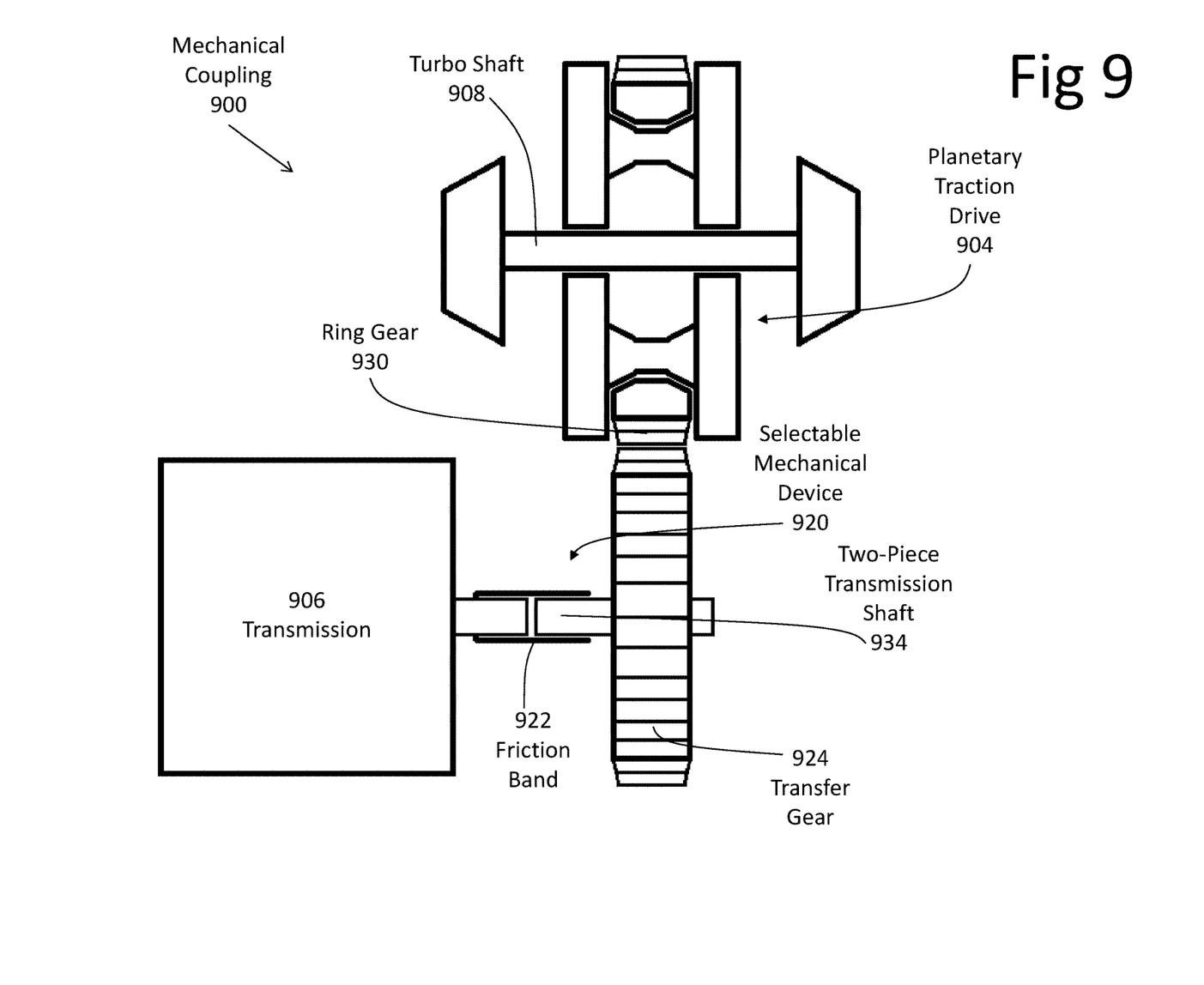
FIG. 9 is a schematic of an embodiment of a mechanical coupling that utilizes a two-piece transmission shaft with a friction band as a selectable mechanical device.

FIG. 9 is a schematic of an embodiment of a mechanical coupling 900 that utilizes a two piece transmission shaft 934 with a friction band 922 as a selectable mechanical device 920, Planetary traction drive 904 has a ring gear 930 that acts as a low-speed output. Ring gear 930 meshes with transfer gear 924, which in turn is mounted on two-piece transmission shaft 934, Transmission 906 is connected to an opposite end of two-piece transmission shaft 934. Friction band 922 closes to connect the two halves of two-piece transmission shaft 934 together when power transmission through selectable mechanical device 920 is needed. When power throughput to turbo shaft 908 is not needed, friction band 922 opens to disengage selectable mechanical device 920 and allow transfer gear 924 to rotate independently of transmission 906. This allows planetary traction drive 904 and turbo shaft 908 to rotate independently of transmission 906. This free-spinning action of turbo shaft 908 reduces mechanical losses of the system associated with transmission 906 when power throughput to or from turbo shaft 908 is not needed.

Figure 10:
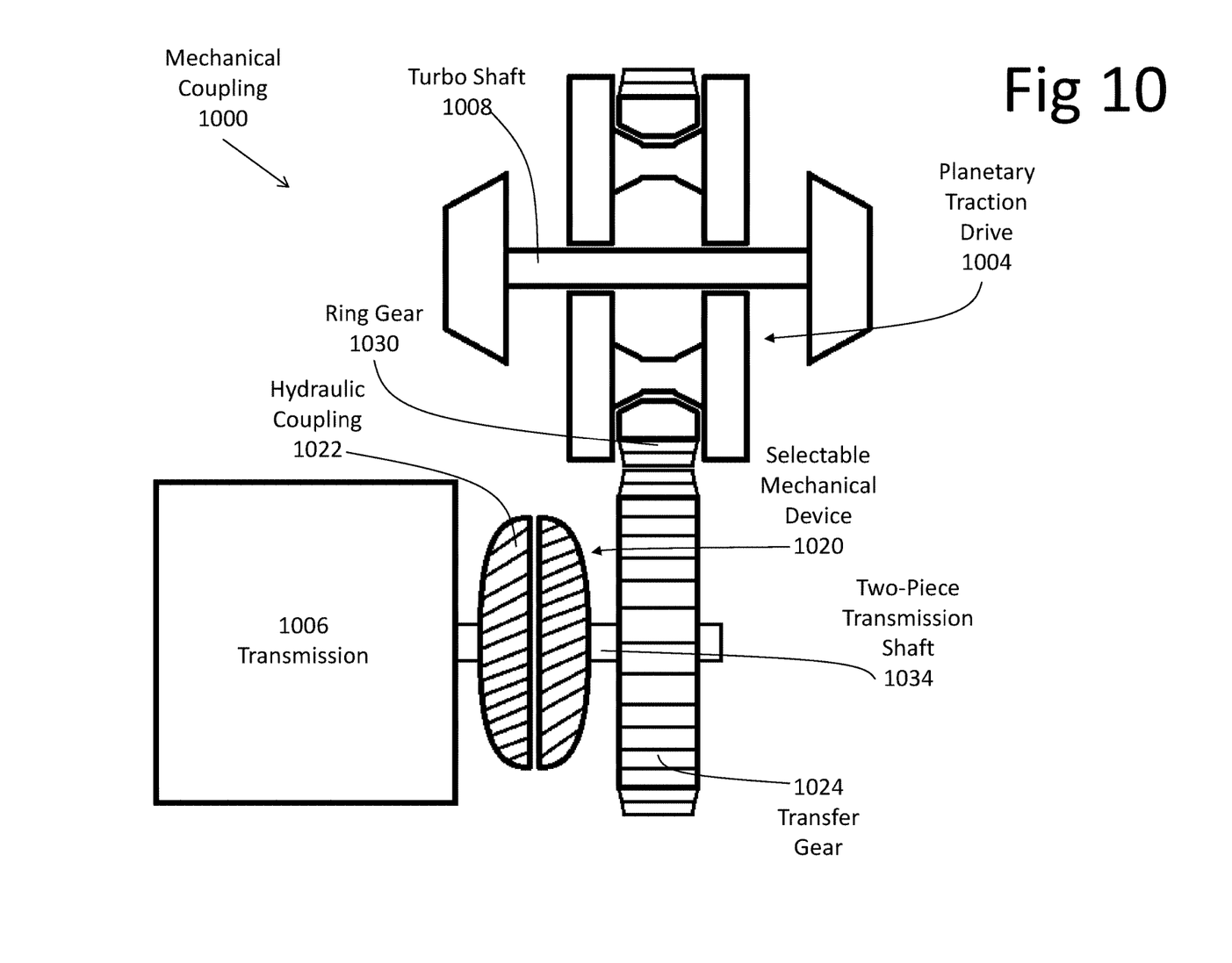
FIG. 10 is a schematic of an embodiment of a mechanical coupling that utilizes a two-piece transmission shaft with a hydraulic coupling as a selectable mechanical device.

FIG. 10 is a schematic of an embodiment of a mechanical coupling 1000 that utilizes a two-piece transmission shaft 1034 with a hydraulic coupling 1022 as a selectable mechanical device 1020. Planetary traction drive 1004 has a ring gear 1030 that acts as a low-speed output. Ring gear 1030 meshes with transfer gear 1024, which in turn is mounted on two-piece transmission shaft 1034. Transmission 1006 is connected to an opposite end of two-piece transmission shaft 1034. Hydraulic coupling 1022 is filled with fluid to couple the two halves of two-piece transmission shaft 1034 together when power transmission through selectable mechanical device 1020 is needed. When power throughput to turbo shaft 1008 is not needed, hydraulic coupling 1022 is drained to disengage selectable mechanical device 1020 and allow transfer gear 1024 to rotate independently of transmission 1006. This allows planetary traction drive 1004 and turbo shaft 1008 to rotate independently of transmission 1006. This free-spinning action of turbo shaft 1008 reduces mechanical losses of the system associated with transmission 1006 when power throughput to or from turbo shaft 1008 is not needed.

Figure 11:
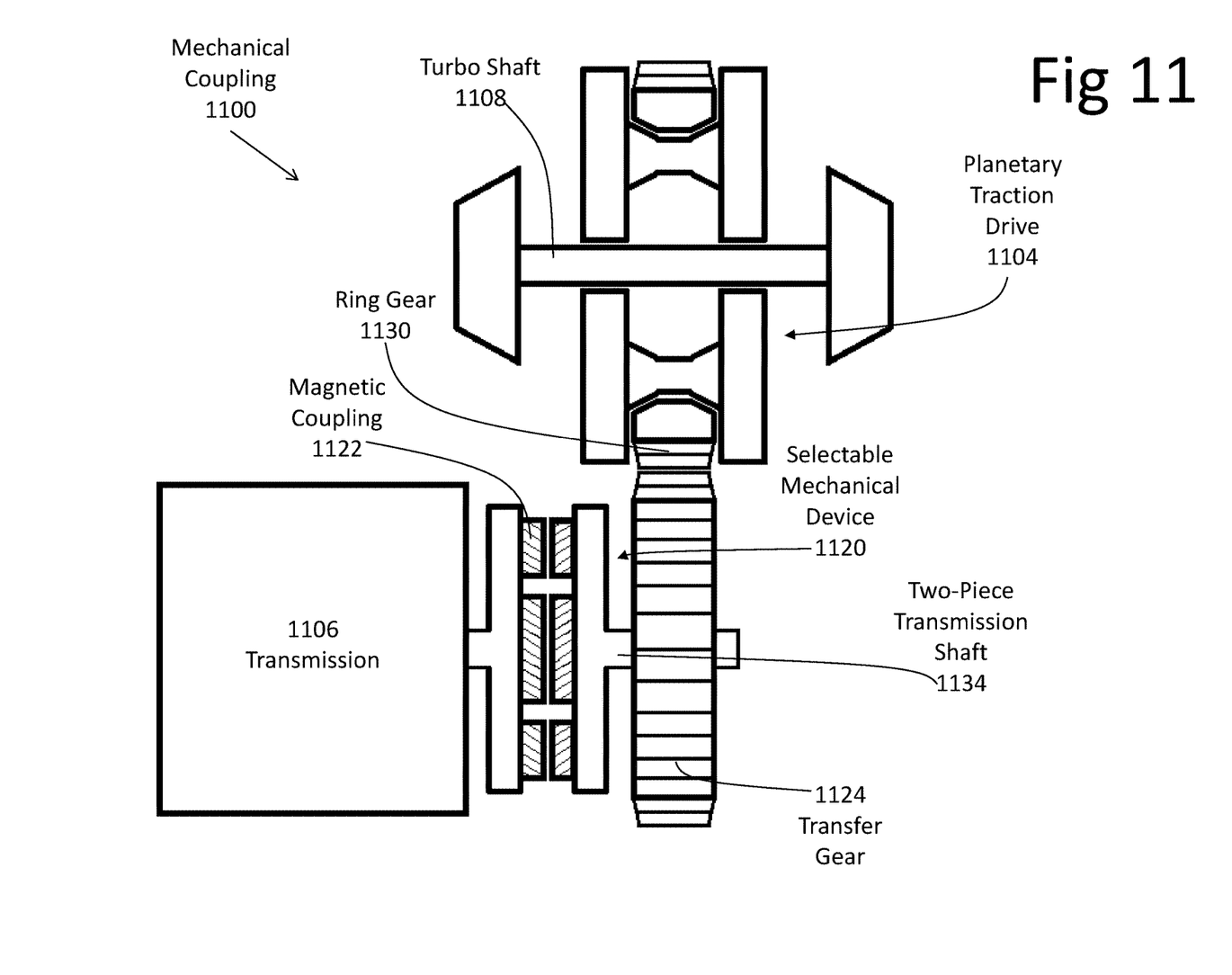
FIG. 11 is a schematic of an embodiment of a mechanical coupling that utilizes a two-piece transmission shaft with a magnetic coupling as a selectable mechanical device.

FIG. 11 is a schematic of an embodiment of a mechanical coupling 1100 that utilizes a two-piece transmission shaft 1134 with a magnetic coupling 1122 as a selectable mechanical device 1120. Planetary traction drive 1104 has a ring gear 1130 that acts as a low-speed output, Ring gear 1130 meshes with transfer gear 1124, which in tune is mounted on two-piece transmission shaft 1134. Transmission 1106 is connected to an opposite end of two-piece transmission Shaft 1134. Magnetic coupling 1122 is engaged to couple the two halves of two-piece transmission shaft 1134 together when power transmission through selectable mechanical device 1120 is needed. When power throughput to turbo shaft 1108 is not needed, magnetic coupling 1122 is disengaged, so that selectable mechanical device 1120 is disengaged and allows transfer gear 1124 to rotate independently of transmission 1106. Magnetic coupling 1122 may incorporate electro-magnets, so that application of electrical power can engage or disengage selectable mechanical device 1120. Disengagement of magnetic coupling 1122 can also be achieved through the use of permanent magnets that are moved away from each other. This allows planetary traction drive 1104 and turbo shaft 1108 to rotate independently of transmission 1106. This free-spinning action of turbo shaft 1108 reduces mechanical losses of the system associated with transmission 1106 when power throughput to or from turbo shaft 1108 is not needed, The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A driven turbocharger for an engine comprising:
a turbo shaft;
a compressor connected to a first location on said turbo shaft;
a turbine connected to a second location on said turbo shaft;
a planetary traction drive that has traction interfaces between said turbo shaft and planet wheels that transmit power to and from said turbo shaft;
a transmission, having a transmission shaft, coupled to said engine;
a ring gear of said planetary traction drive;
an idler shaft;
a first idler gear that meshes with said ring gear and is coupled to said idler shaft;
a second idler gear that is coupled to said idler shaft;
a transfer gear that meshes with said second idler gear and is coupled to said transmission to transfer power between said transmission and said idler shaft;
an idler shaft clutch disposed between said first idler gear and said second idler gear that selectively rotationally unlocks said first idler gear and said second idler gear which releases said turbo shaft from said transmission shaft so that said turbo shaft can spin freely without drag from said transmission and rotate when said turbo shaft is coupled to said transmission;
a transmission clutch that releases said transmission from said engine so that said engine can operate freely without drag from said transmission and rotate when said transmission is coupled to said engine.

2. The driven turbocharger of claim 1 where said idler shaft clutch is a friction clutch.

3. The driven turbocharger of claim 1 where said idler shaft clutch is a magnetic clutch.

4. The driven turbocharger of claim 1. where said idler shaft clutch is a synchronizer.

5. The driven turbocharger of claim 1 where said transmission is a continuously variable transmission.

6. A method of coupling a driven turbocharger to an engine comprising:
connecting a compressor to a first location on a turbo shaft;
connecting a turbine to a second location on said turbo shaft;
interfacing a planetary traction drive to said turbo shaft to transmit power to and from said turbo shaft;
coupling and decoupling a transmission to said engine using a transmission clutch so that a transmission shaft can spin freely when said engine is decoupled from said transmission and rotate when said transmission is coupled to said engine;
providing an idler shaft;
coupling a first idler gear to said idler shaft that meshes with a ring gear of said planetary traction drive;
coupling a second idler gear to said idler shaft;
coupling a transfer gear to said transmission that meshes with said second idler gear to transfer power between said transmission and said idler shaft;
coupling and decoupling said planetary traction drive and said transmission using an idler shaft clutch disposed between said first idler gear and said second idler gear so that said turbo shaft can spin freely when said planetary traction drive is decoupled from said transmission and rotate when said planetary traction drive is coupled to said transmission.

7. The method of claim 6, said method further comprising:
shifting said transmission, while said turbo shaft clutch is disengaged, to a ratio that produces a near zero rotational speed differential across said turbo shaft clutch before said turbo shaft clutch is engaged.

8. The method of claim 6 where said process of mechanically coupling and decoupling said planetary traction drive and said transmission comprises using a synchronizer with idler shaft clutch.

9. The method of claim 6 where said process of mechanically coupling and decoupling said planetary traction drive and said transmission comprises using a friction band idler haft clutch.

10. The method of claim 6 where said process of mechanically coupling and decoupling said planetary traction drive and said transmission omprises using a hydraulic coupling idler shaft clutch.

11. The method of claim 6 where said process of mechanically coupling and decoupling said planetary traction drive amid said transmission comprisesusing a magnetic coupling idler shaft clutch.

* * * * *